Figure 1:
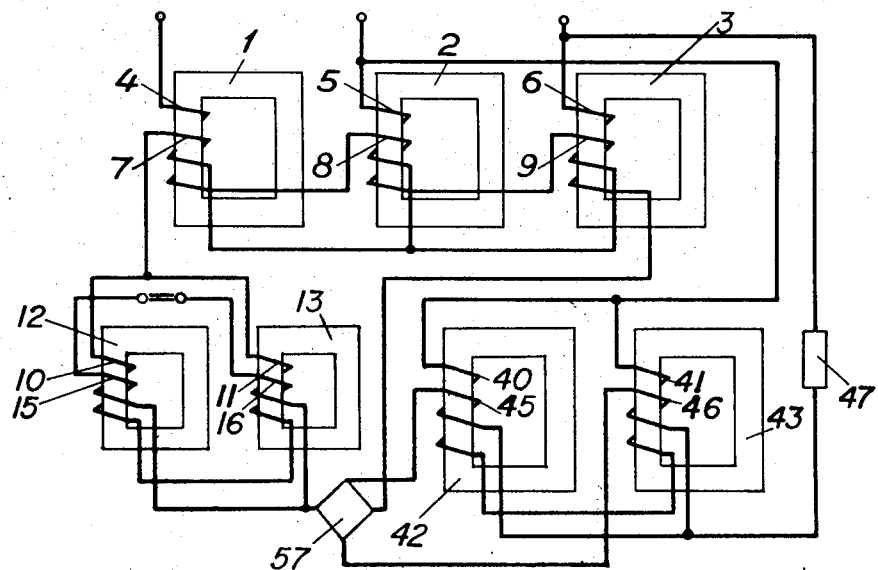

July 24, 1951

U. LAMM 2,562,047

MEANS FOR REINFORCING ELECTRIC CURRENTS BY
DIRECT-CURRENT SATURATED INDUCTANCES

Filed Oct. 21, 1947

Inventor
UNO LAMM
By James Aiken
Attorney.

Patented July 24, 1951

2,562,047

UNITED STATES PATENT OFFICE 2,562,047

MEANS FOR REINFORCING ELECTRIC CURRENTS BY DIRECT-CURRENT SATURATED INDUCTANCES

Uno Lamm, Ludvika, Sweden, assignor to Allmänna Svenska Elektriska Aktiebolaget, Vasteras, Sweden, a Swedish corporation Application October 21, 1947, Serial No. 781,107
In Sweden February 13, 1939

Section 1, Public Law 690, August 8, 1946
Patent expires February 13, 1959

4 Claims. (Cl. 323—89)

D. C. saturated inductances having a small leakage between the D. C. and the A. C. windings—in the following for the sake of brevity, named "transductors"—may, as is known, be considered as a kind of amplifiers, as in the case of proper dimensioning nearly full proportionality is obtained between an entering direct current of low power and an out-going alternating current of considerably higher power, which alternating current may in turn be rectified and may influence another amplifier. In an amplifier, it is generally not only the degree of amplification but also the time of operation which is of importance. It has been found that in transductors, the A. C. value follows the D. C. value practically instantaneously, so that the time of operation only depends on the time in which the saturating direct current reaches its full value. This time depends, in the complex device represented by the transductor, on several factors, but an investigation shows it to be, with a reasonable approximation, inversely proportional to the ratio between the ohmic resistance in the D. C. circuit and an equivalent inductance which depends, among other items, on the winding and the dimensions of the iron core.

The total available entering power may as a rule be considered as given, and the ohmic resistance in the entering circuit can therefore not be increased without decreasing at the same time the current and thus increasing the amplification necessary for obtaining the same outgoing power. The equivalent inductance cannot, in an economically utilized transductor, be reduced without a reduction of the size of the iron core. According to the present invention, for giving the same amount of power in a smaller iron core or a larger amount of power in a given iron core, a frequency increaser is connected in such transductors, in which the primary source of energy is an A. C. network, between the said network and the transductor. The A. C. power then increases with the frequency, while the entering D. C. power undergoes no considerable change, neither in value nor in time of operation (time constant).

It is known that the power of a transformer, or the reactive power consumption of a reactor, directly increases with the frequency, other quantities being equal. The transductor or D. C. saturable reactor, when used as an amplifier, can be directly compared with a transformer, in which the traversing alternating current power is proportional to the saturating direct current power. The alternating current power is of course furnished by the current source and not by the transductor itself, but the possibility of controlling it between certain limits depends on the reactance of the transductor, and as this reactance is proportional to the frequency, the controlled power also is.

On the other hand, it is a well-known fact that the proportion between the self-inductance of a D. C. winding on an iron core and the ohmic resistance of the said winding, which determines the time constant of the direct current when varying from one value to another, is constant for a certain dimensioning of the core and direct current winding. While the time of regulation—in practice, four times the time constant—is the same, the alternating current power controlled is proportional to the frequency and thus highly raised by the use of a "frequency increaser."

In the case of several transductors connected in cascade for a multi-step amplification, one or more of these may be fed with an increased frequency. This is of special importance at the lowest step, where the entering power has the smallest value.

The invention is of special importance in transductors for regulating purposes in the proper sense of the word, i. e. for an action to keep an operating quantity constant. Such regulators always comprise, on the transductor, saturating direct current ampere turns proportional to the difference between a constant quantity and a quantity to be regulated. In such cases, the entering power is, for the same total amount of power available, low in the same proportion as the regulating is accurate, the direct current representing for instance the difference between a constant quantity and the quantity to be regulated, and it is therefore of special importance to be able to obtain, with a low entering power, a high eventual power without making the time of regulation too long.

The frequency increaser may preferably be of a static type, based on harmonics in the A. C. curve caused by saturation of the iron. A simple kind of such a static frequency increaser is a saturated three-phase transformer having its primary winding connected in Y and its secondary winding in open delta, the current being taken off between the end terminals of the latter. This current has three times the frequency of the feeding network, which often has been found appropriate at the most common value of the network frequency, 50 cycles. If twice the network frequency is considered sufficient, this can be obtained by means of a transductor, in which the two A. C. windings fed from outside are connected in series and a third pair of windings is introduced, the windings of which are connected in mutual opposition as compared with those fed from outside. In this third pair of windings, a current of twice the original frequency is obtained.

Figure 2:
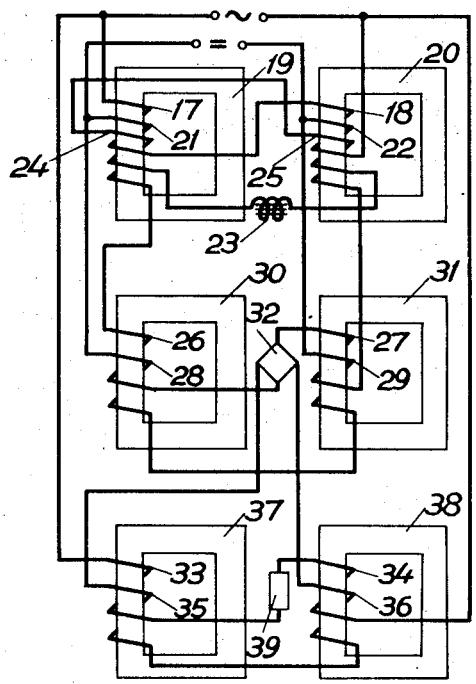

In the accompanying drawings, Fig. 1 shows one form of the invention with a static frequency increaser in the form of a three-phase transformer, and Fig. 2 shows a modified form of the invention with a single-phase A. C. voltage.

Referring to Fig. 1, the static frequency increaser in the form of a three-phase transformer has three independent iron cores 1, 2, 3, a primary star-connected winding 4, 5, 6, and a secondary winding 7, 8, 9 connected in open delta. The transductor, or direct current saturable reactor, consists in this case of two series-connected coils 10, 11 wound on separate iron cores 12, 13 and is connected in series with the phase windings 7, 8, 9, while D. C. windings 15, 16 on the same cores 12, 13 are connected in the usual manner to compensate the voltages induced therein by the A. C. windings. The terminals of the secondary windings of the three-phase transformer are equipotential for the fundamental voltage wave, while the third harmonic voltages caused by the saturation, which are especially prominent in transformers having three separate iron cores, add themselves to the three-phase windings and form a comparatively high voltage of three times normal frequency impressed on the reactor windings 10, 11. In the arrangement shown, a rectifier 57 is fed from the said transductor and feeds a second transductor similar to the first but of larger dimensions. The cores 42, 43 of this second transductor have D. C. windings 45, 46 fed from the rectifier 57, while the A. C. windings 40, 41 are fed from two A. C. terminals and are connected to the final load 47.

In Fig. 2, a single-phase A. C. voltage is impressed on the two windings 17, 18 wound on two separate iron cores 19, 20 carrying also a pair of D. C. windings 21, 22 connected to compensate the fundamental waves of the A. C. voltages induced therein and having a separate inductance 23 in series therewith for preventing a short-circuiting of the second harmonic. Such a harmonic is therefore created in a third pair of windings 24, 25 connected in the same sense as the D. C. windings and in series with the D. C. saturable reactor having A. C. windings 26, 27, D. C. windings 28, 29 and iron cores 30, 31. The load in series with the A. C. windings consists in this figure of a rectifier 32 which forms the D. C. source of a second D. C. saturable reactor, having A. C. windings 33, 34, D. C. windings 35, 36 and iron cores 37, 38. The alternating current finally traverses a core 39. This second reactor may be fed by ordinary frequency, while the lower step reactor, as aforesaid, is fed by an increased (double) frequency.

I claim as my invention:

1. Means for amplifying an electric current, comprising a reactor having a winding, means providing direct current ampereturns to traverse said winding and saturate the said reactor, an alternating current source for a current traversing the reactor, a frequency multiplier, means whereby said multiplier is fed by said alternating current source, and means whereby the said multiplier feeds said reactor.

2. Means according to claim 1 comprising means for regulating said saturating direct current ampereturns to be proportional to the difference between a constant quantity and a quantity to be regulated.

3. Means according to claim 1 comprising a rectifier having alternating current input connected in series with said saturable reactor and a second saturable reactor fed by the direct current output from said rectifier.

4. Means for amplifying an electric current, comprising a reactor having a winding, means providing direct current ampereturns traversing said winding and saturating the said reactor, an alternating current source for a current traversing the reactor, a static frequency multiplier, means whereby said multiplier is fed by said alternating current source, and means whereby said multiplier feeds said reactor.

UNO LAMM.

REFERENCES CITED

The following references are of record in the file of this patent:

UNITED STATES PATENTS

| Number | Name | Date |
| --- | --- | --- |
| 1,215,820 | Kujirai | Feb. 13, 1917 |
| 1,372,203 | Schoenberg | Mar. 22, 1921 |
| 1,730,254 | Thomas | Oct. 1, 1929 |
| 1,855,639 | Lee | Apr. 26, 1932 |
| 2,450,286 | Livingston | Sept. 28, 1948 |

FOREIGN PATENTS

| Number | Country | Date |
| --- | --- | --- |
| 446,790 | Great Britain | May 6, 1936 |